UNITED STATES PATENT OFFICE.

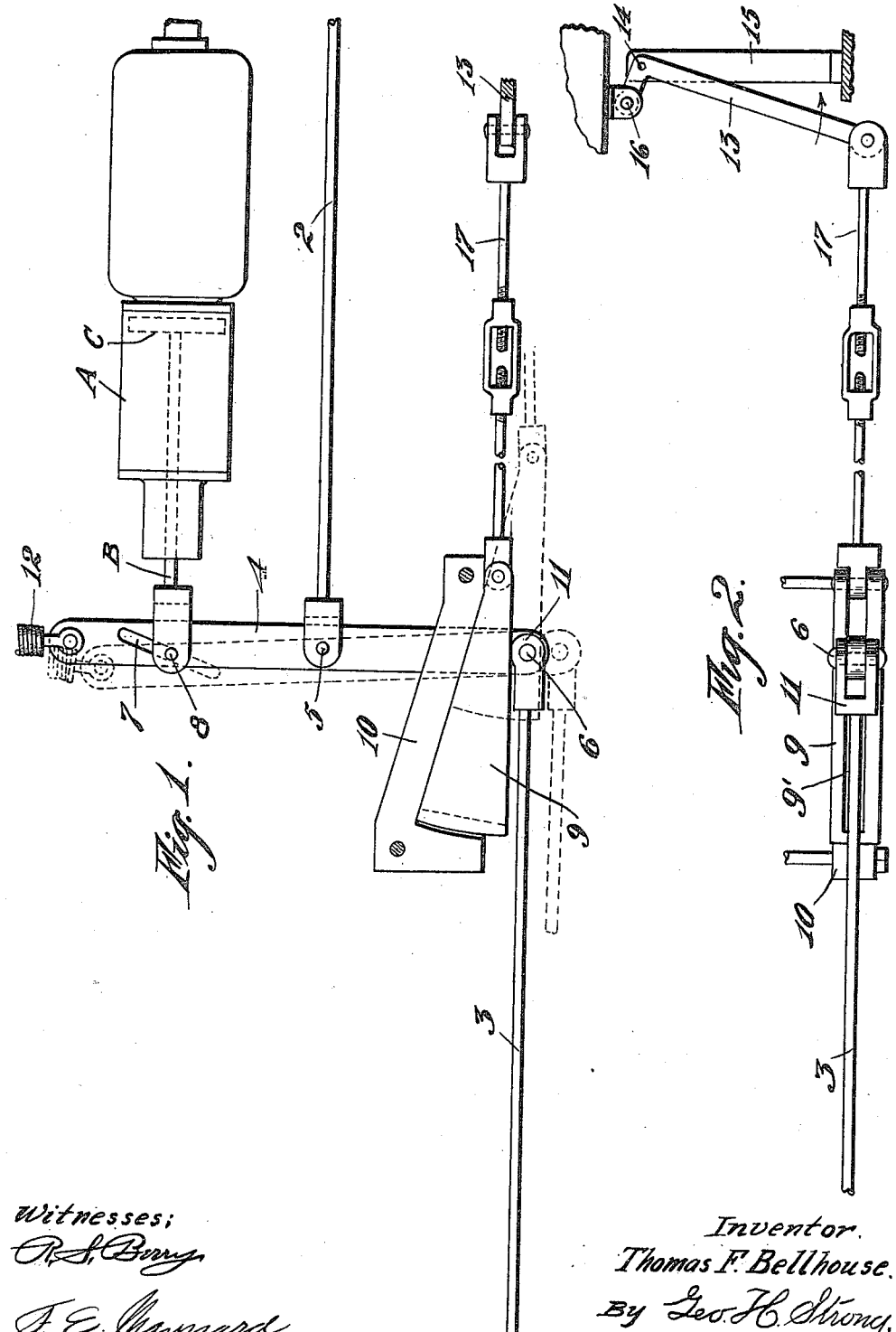

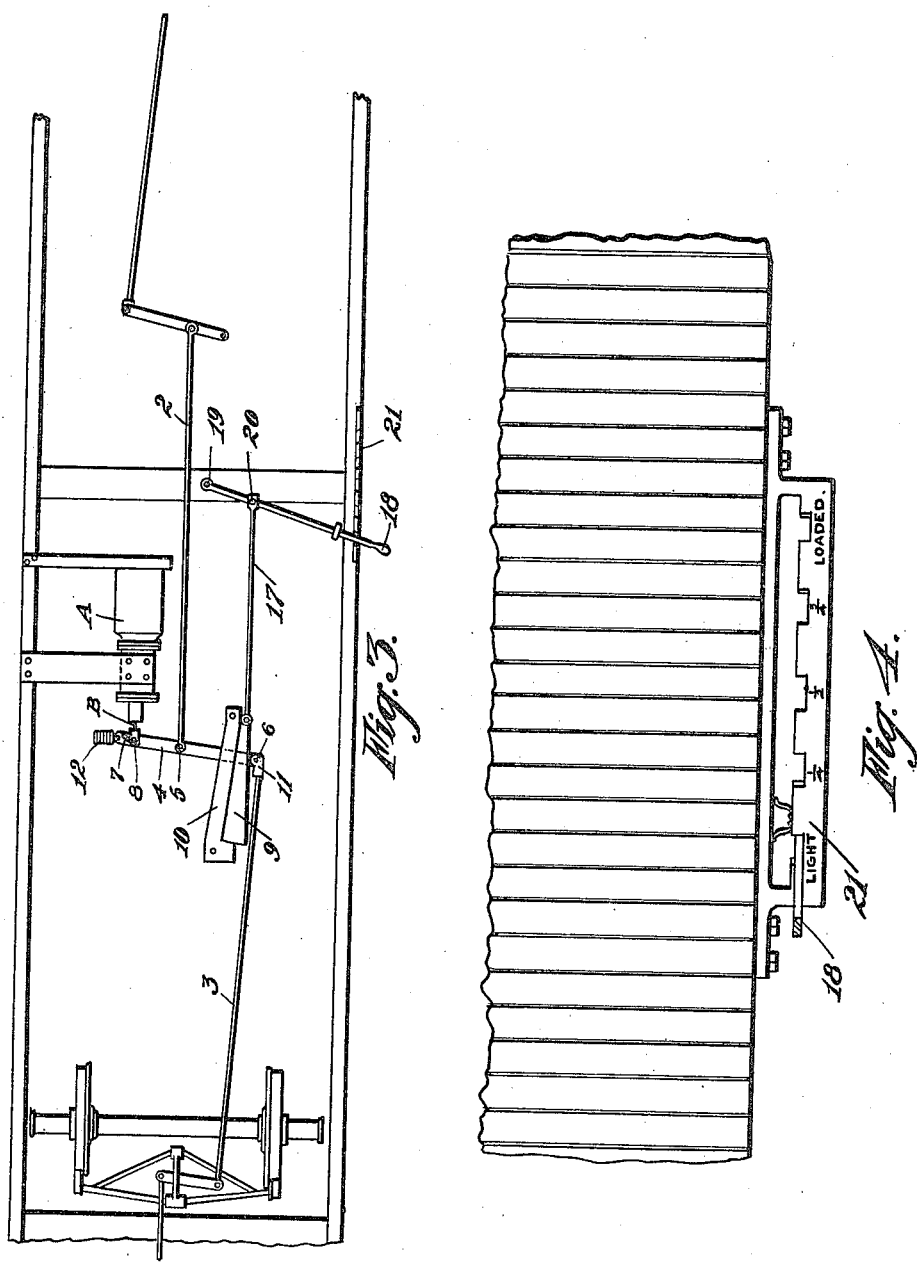

THOMAS F. BELLHOUSE, OF SACRAMENTO, CALIFORNIA.

CAR-BRAKE-LEVERAGE ADJUSTMENT.

993,947. Specification of Letters Patent. Patented May 30, 1911.

Application filed July 13, 1910. Serial No. 571,750.

*To all whom it may concern:*

Be it known that I, THOMAS F. BELLHOUSE, a citizen of the United States, residing at Sacramento, in the county of Sacramento and State of California, have invented new and useful Improvements in Car-Brake-Leverage Adjustment, of which the following is a specification.

This invention relates to a device for regulating the power of brakes on railway cars and the like.

It is the object of this invention to provide a device which is adapted to be used in conjunction with modern air brake systems for the purpose of adjusting the length of the brake-levers so as to vary the pressure of the brakes on the wheels according to the weight of the car.

A further object is to provide a device of this character which is simple in construction and operation, and which may be readily applied to most cars now in use.

In railway operations it is well known that greater brake pressure is required on heavily loaded cars than on light or empty cars, in order to decrease their speed or bring them to a stop. This is particularly noticeable in handling long trains on down grades where the cars are unequally loaded, the brakes on the lighter cars usually operating effectually while those on the heavily laden cars fail, with the possible result of breaking the train in two. By the use of this invention this difficulty and danger may be overcome as the brakes will be caused to operate equally throughout the train, regardless of great variation of weight in the cars and of their disposition or arrangement in the train.

The invention consists of combination of parts and details of construction, as will be more fully explained by reference to the accompanying drawings, in which—

Figure 1 is a plan view of the invention. Fig. 2 is a side elevation. Fig. 3 is a plan view of a modified form of the device. Fig. 4 is a detail in elevation of the lever retaining rack.

In the drawings A represents the ordinary brake cylinder of an air brake system and B is the push rod reciprocal therein, and actuated by a piston C in the well known manner.

2 and 3 are the brake rods leading to and connected with the brake shoes mounted on the front and rear trucks respectively, and 4 is the brake lever by which the rods 2—3 are connected to the push rod C. The brake rod 2 is pivoted to the lever 4 near its center as at 5 and the rod 3 is pivotally secured to the outer end of the lever at 6, as is common in brake construction.

My present invention resides in providing an obliquely disposed slot 7 in the lever 4 at the point where the push rod B connects therewith, a pin 8 extending through and slidable in the slot 7 being secured to a yoke on the push rod B, and to provide means by which the brake lever 4 may be moved longitudinally so that the push rod B will bear against the lever 4 at different points in the length of the slot 7.

The longitudinal movement of the lever 4 is accomplished by means of a slidable wedge 9 which operates between a fixed member 10 and the yoke 11 on the rod 3 at the outer end of the lever 4, as will be later described; the lever 4 extending through a slot 9' in the wedge 9. A coil spring 12 is secured to the inner end of the lever 4 in such manner as to normally retain the lever 4 in its innermost or normal position, shown in the drawings. The wedge 9 may be operated by various means, either automatically or by hand, both methods being shown in the drawings, the former in Figs. 1 and 2 and the latter in Figs. 3 and 4. The automatic adjustment of the wedge 9 and lever 4 is accomplished through the medium of a bell crank lever 13 which is fulcrumed at 14 to a rigid member 15 mounted on the trucks not shown. The short arm of the lever is connected to the car body as at 16 and the long arm is attached to a connecting rod 17 which leads to and is secured to the small end of the wedge 9. As the car is loaded it depresses the springs on which it is supported and approaches close to the trucks. Any downward movement of the car body will actuate the lever 13 so as to pull the wedge 9 lengthwise and thereby move the lever 4 longitudinally. The push rod B, being stationary, the pin 8 will be caused to contact the sides of the slot 7 at different points as the lever 4 is moved lengthwise, thus increasing the length of the lever arm between the fulcrum point 5 and the point of power 8. The slot 7 being obliquely disposed, insures the distance of the throw of the lever 4 being the same at all times.

Where it is not desirable to actuate the wedge 9 automatically, the hand lever 18 shown in Figs. 3 and 4 is employed. This lever is fulcrumed at 19 and is secured to the connecting rod 17 at 20. A notched rack 21 is suitably placed on the car body into the notches of which the lever 18 is adapted to be engaged so as to retain it in any desired position. These notches may be graduated and numbered to indicate the necessary position of the lever for different loads as shown in Fig. 4.

The operation of the invention is as follows; the parts being in the position shown in full lines in Fig. 1, which position is that assumed on a car of normal weight. The tonnage of the car being increased the wedge 9 is moved lengthwise a distance proportional to the increased tonnage so as to lengthen the distance between the fulcrum point 5 and the point of the application of power 8 on the brake lever 4. The wedge 9 being locked in its newly assumed position such as shown in dotted lines, Fig. 1, the leverage or power of the lever 4 is increased, so that when the brakes are applied through the air brake cylinder A and push rod B; their pressure on the car wheels will be intensified according to position of the wedge 9 and the lever 4. As the position of the lever and wedge are governed by the weight of the car it becomes evident that the brake pressures will be in proportion to that weight. When the car is unloaded and the wedge 9 moved back to its normal position, the spring 12 will return the lever 4 to its innermost position. The incline of the side walls of the slot 7 insures the lever 4 being returned to its innermost position when the push rod 4 is moved outward.

Having thus described my invention, what I claim and desire to secure by Letters Patent is—

1. In a car brake having a brake lever and a push rod, an adjustable engagement between said lever and said rod; and means actuated by the load of the car for moving said brake lever so as to adjust the point of engagement with said push rod.

2. In a car brake having a fulcrumed brake lever and a reciprocating push rod, an adjustable engagement between said lever and said rod, and means actuated by the load of the car for moving said brake lever longitudinally to adjust the point of engagement with said push rod.

3. In a car brake having a brake lever and a push rod, an adjustable engagement between the brake lever and the push rod comprising a pin on said push rod slidable in a slot in said brake lever, and means actuated by the load of the car for moving said lever longitudinally so as to adjust the position of the pin in the slot.

4. In a car brake having a brake lever and a push rod, an adjustable engagement between the brake lever and the push rod comprising a pin on said push rod slidable in a diagonally disposed slot in said brake lever, and means actuated by the load of the car for actuating said brake lever longitudinally to adjust the point of engagement of the pin with the walls of the slot.

5. In a car brake having a brake lever and a push rod adjustably connected therewith, means actuated by the load of the car for moving said brake lever longitudinally independent of said push rod.

6. In a car brake having a fulcrumed brake lever and a reciprocal push rod adjustably connected therewith, means actuated by the load of the car for moving said brake lever longitudinally independent of said push rod to adjust the distance between the fulcrum point of said brake lever and the point of engagement with said push rod.

7. In a car brake having a brake lever and a push rod, means for moving said brake lever longitudinally independent of said push rod, said means embodying a movable wedge engageable with said brake lever to move the lever lengthwise in one direction and a spring connected to said lever and opposed to said wedge for moving the lever in the other direction.

8. In a car brake having a brake lever and a push rod, means for moving said brake lever longitudinally independent of said push rod, said means embodying a movable wedge engageable with said brake lever to move the lever lengthwise in one direction and a spring connected to said lever and opposed to said wedge for moving the lever in the other direction, means for reciprocating said movable wedge, and means for retaining the wedge in a fixed position.

9. In a car brake having a brake lever and a push rod, means for moving said brake lever longitudinally independent of said push rod, said means embodying a movable wedge slidable between a fixed member and an abutment on the brake lever, means by which said wedge is reciprocated to move said brake lever in one direction, and a means opposed to said wedge for returning the lever to a normal position.

10. In a car brake having a brake lever and a push rod, an adjustable engagement between brake lever and the push rod comprising a pin on said push rod slidable in a diagonally disposed slot in said brake lever, means for moving said brake lever longitudinally independent of said push rod, said means embodying a movable wedge slidable between a fixed member and an abutment on the brake lever, means by which said movable wedge is reciprocated, means for retaining the wedge in a fixed position, and means opposed to said wedge for returning the brake lever to its normal position.

In testimony whereof I have hereunto set my hand in the presence of two subscribing witnesses.

THOMAS F. BELLHOUSE.

Witnesses:
H. H. JOHNSON,
E. L. PENDA.

Copies of this patent may be obtained for five cents each, by addressing the "Commissioner of Patents Washington, D. C."